(12) United States Patent
Shevenell (10) Patent No.: US 9,264,320 B1
(45) Date of Patent: Feb. 16, 2016

(54) EFFICIENT NETWORK MONITORING (71) Applicant: CA, Inc., Islandia, NY (US)

(72) Inventor: Michael Shevenell, Dover, NH (US)

(73) Assignee: CA, Inc., Islandia, NY (US)

(*) Notice: Subject to any disclaimer, the term of this patent is extended or adjusted under 35 U.S.C. 154(b) by 112 days.

(21) Appl. No.: 14/307,032

(22) Filed: Jun. 17, 2014

(51) Int. Cl.
*H04L 12/26* (2006.01)
*H04L 12/851* (2013.01)

(52) U.S. Cl.
CPC .......... *H04L 43/02* (2013.01); *H04L 43/10* (2013.01); *H04L 47/24* (2013.01)

(58) Field of Classification Search
None
See application file for complete search history.

(56) References Cited

U.S. PATENT DOCUMENTS

| | | |
|---|---|---|
| 6,961,770 B1 | 11/2005 | Ott |
| 7,050,396 B1 | 5/2006 | Cohen et al. |
| 7,206,848 B1 | 4/2007 | Zara et al. |
| 7,272,119 B2 * | 9/2007 | Rudnick ............... H04L 47/10 370/329 |
| 7,272,651 B1 | 9/2007 | Bolding et al. |
| 7,380,025 B1 | 5/2008 | Riggins et al. |
| 7,411,948 B2 | 8/2008 | Danner et al. |
| 7,606,159 B2 | 10/2009 | Dalal et al. |
| 7,616,962 B2 | 11/2009 | Oswal et al. |
| 7,627,675 B2 | 12/2009 | Bernstein et al. |
| 7,813,316 B2 | 10/2010 | Sastry |
| 7,817,571 B2 | 10/2010 | Claise et al. |
| 8,174,983 B2 | 5/2012 | Khan et al. |
| 8,195,815 B2 | 6/2012 | Woodman |
| 8,345,682 B2 | 1/2013 | Pignataro et al. |
| 8,520,672 B2 | 8/2013 | Guichard et al. |
| 8,559,310 B2 | 10/2013 | Saxena |
| 2004/0109410 A1 * | 6/2004 | Chase ................ H04L 12/2602 370/229 |
| 2004/0221032 A1 | 11/2004 | Bernstein et al. |
| 2005/0254419 A1 * | 11/2005 | Barker ............... H04L 43/0894 370/229 |
| 2007/0047446 A1 | 3/2007 | Dalal et al. |
| 2009/0059791 A1 | 3/2009 | Saxena |
| 2009/0113062 A1 | 4/2009 | Woodman |
| 2010/0054125 A1 | 3/2010 | Bernstein et al. |
| 2010/0077100 A1 * | 3/2010 | Hsu ................... H04W 72/1221 709/234 |
| 2010/0214926 A1 | 8/2010 | Khan et al. |
| 2011/0063986 A1 | 3/2011 | Denecheau et al. |
| 2014/0211624 A1 * | 7/2014 | Rajasekaran .......... H04L 47/30 370/235 |
| 2014/0313954 A1 * | 10/2014 | Choi ................. H04W 52/0258 370/311 |
| 2015/0334681 A1 * | 11/2015 | Wu ....................... H04W 72/04 370/329 |

* cited by examiner

*Primary Examiner* — Otis L Thompson, Jr.
(74) *Attorney, Agent, or Firm* — Coats & Bennett, P.L.L.C.

(57) ABSTRACT

According to one aspect of the present disclosure, a computer-implemented method is disclosed, in which a determination is made for each of a plurality of network interfaces of whether an amount of traffic on the network interface exceeds a predefined traffic threshold. Each of the network interfaces whose amount of traffic is below the traffic threshold is excluded from Quality of Service (QoS) polling. For each of the non-excluded network interfaces whose traffic exceeds the traffic threshold, a determination is made of a set of traffic classes transported on the network interface, and any of the traffic classes with a priority level below a cutoff threshold are excluded from QoS polling. For each non-excluded traffic class that has a priority level above the cutoff threshold, a determination is made of a per-class QoS polling rate based on the respective priority level of the traffic class.

24 Claims, 6 Drawing Sheets

| PRIORITY | TRAFFIC CLASS | DESIRED POLLING RATE |
|---|---|---|
| 1 | VOICE | 30 SECONDS |
| 2 | VIDEO CONFERENCE | 30 SECONDS |
| 3 | AUTHENTICATION | 60 SECONDS |
| 4 | STREAMING VIDEO | 60 SECONDS |
| 5 | WEB TRAFFIC | 300 SECONDS |
| 6 | EMAIL | NO POLLING |
| 7 | SOFTWARE UPDATES | NO POLLING |
| 8 | DATA BACKUP | NO POLLING |

FIG. 4

| INTERFACE | THROUGHPUT | COMPOSITION |
|---|---|---|
| A | 1 Mbps | VOICE (100%) |
| B | 15 Mbps | VOICE (50%)<br>STREAMING VIDEO (10%)<br>WEB TRAFFIC (30%)<br>EMAIL (10%) |
| C | 30 Mbps | VOICE (10%)<br>EMAIL (90%) |
| D | 45 Mbps | WEB TRAFFIC (90%)<br>SOFTWARE UPDATES (10%) |

EFFICIENT NETWORK MONITORING

TECHNICAL FIELD

The present disclosure relates to Quality of Service (QoS), and more particularly relates to selectively excluding network interfaces and/or traffic classes from QoS polling.

BACKGROUND

Quality of Service (QoS) describes the overall performance of a network (e.g., a computer network, a telephony network, or a combination thereof). In particular, QoS often focuses on performance as seen by a user of such a network, and considers things such as error rates, bandwidth, throughput, delays, etc.

QoS plays a significant role in both enterprise networks and Communications Service Provider (CSP) networks. An example CSP network could include one operated by a large service provider such as VERIZON or AT&T, which includes a combination of cellular service, Public Switched Telephone Network (PSTN) service, cable television service, broadband Internet service, etc. A CSP network is typically a larger scale network than an enterprise network. In CSP networks, voice, video, data, and mobile services are often shared among multiple tenants.

As networks grow, so too does the number of network interfaces that are available for QoS monitoring. With this increased quantity of network interfaces, along with significantly increased traffic levels and more "mission critical" applications being deployed on modern networks, the need for QoS enforcement increases. This becomes particularly important in CSP networks which must meet strict Service Level Agreements (SLAB) or face revenue penalties.

Network interfaces may carry a wide variety of types of network traffic (known as "traffic classes"). Some example traffic classes could include voice, video conferencing, email, streaming video, and web traffic, for example. These different traffic classes may require unique handling which respects their sensitivities for delay, loss, jitter and throughput. To analyze network interfaces and the traffic classes they support, QoS polling is performed based on a plurality of so-called "key performance indicators" (KPIs). Some example KPIs could include a quantity of dropped packets, a probability that an incoming packet will be dropped, a quantity of delayed packets, etc. The same KPI may be analyzed separately for each of the plurality of traffic classes.

Considering the large amount of KPIs that can be analyzed for a given network interface, it is not uncommon for a given QoS polling cycle to yield hundreds of thousands if not millions of KPI responses. This amount of data will continue to grow as networks grow to support an increasing number of network interfaces. Sifting through this vast amount of data to make appropriate network decisions poses a significant challenge for network administrators.

SUMMARY

According to one aspect of the present disclosure, a computer-implemented method is disclosed in which, for each of a plurality of network interfaces, a determination is made of whether an amount of traffic on the network interface exceeds a predefined traffic threshold. Each of the network interfaces whose amount of traffic is below the traffic threshold is excluded from Quality of Service (QoS) polling. For each of the non-excluded network interfaces whose traffic exceeds the traffic threshold, the following is performed:

determining a set of traffic classes transported on the network interface;
excluding any of the traffic classes with a priority level below a cutoff threshold from QoS polling; and
for each non-excluded traffic class that has a priority level above the cutoff threshold, determining a per-class QoS polling rate based on the respective priority level of the traffic class.

According to another aspect of the present disclosure, a computing device is disclosed that includes a communications interface circuit and a processing circuit. The communications interface circuit is configured to communicate data with a plurality of computing devices that support a plurality of network interfaces in a network. The processing circuit is configured to determine, for each of the plurality of network interfaces, whether an amount of traffic on the network interface exceeds a predefined traffic threshold; and exclude each of the network interfaces whose amount of traffic is below the traffic threshold from QoS polling. The processing circuit is further configured to, for each of the non-excluded network interfaces whose traffic exceeds the traffic threshold:

determine a set of traffic classes transported on the network interface;
exclude any of the traffic classes with a priority level below a cutoff threshold from QoS polling; and
for each non-excluded traffic class that has a priority level above the cutoff threshold, determine a per-class QoS polling rate based on the respective priority level of the traffic class.

According to another aspect of the present disclosure, a computer program product is disclosed comprising a computer readable storage medium having computer readable program code embodied therewith. The computer readable program code includes computer readable program code configured to determine, for each of a plurality of network interfaces, whether an amount of traffic on the network interface exceeds a predefined traffic threshold; and computer readable program code configured to exclude each of the network interfaces whose amount of traffic is below the traffic threshold from QoS polling. The computer readable program code also includes computer readable program code configured to, for each of the non-excluded network interfaces whose traffic exceeds the traffic threshold:

determine a set of traffic classes transported on the network interface;
exclude any of the traffic classes with a priority level below a cutoff threshold from QoS polling; and
for each non-excluded traffic class that has a priority level above the cutoff threshold, determine a per-class QoS polling rate based on the respective priority level of the traffic class.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes techniques for selectively excluding network interfaces and/or traffic classes from Quality of Service (QoS) polling. For example, network interfaces can be excluded from QoS polling if an amount of traffic on those interfaces is below a traffic threshold. For non-excluded network interfaces, certain traffic classes on those interfaces can also be excluded if they have a priority level below a cutoff threshold. Such exclusions can help to focus QoS monitoring resources on interfaces that carry larger amounts of traffic, and that carry traffic classes that are of particular importance. Also, per-class QoS polling rates can be determined based on the respective priority levels of given traffic classes, such that traffic classes that are of a higher priority for QoS purposes can be polled more rapidly than those that are of a lower concern on a given network interface. Using the techniques discussed herein, KPIs for the most significant, important, and interesting traffic can be polled more frequently, and KPIs for less important or less interesting traffic can be polled less frequently, or never. This can provide considerable efficiency improvements by utilizing less network bandwidth and computational resources in connection with QoS.

Figure 1:
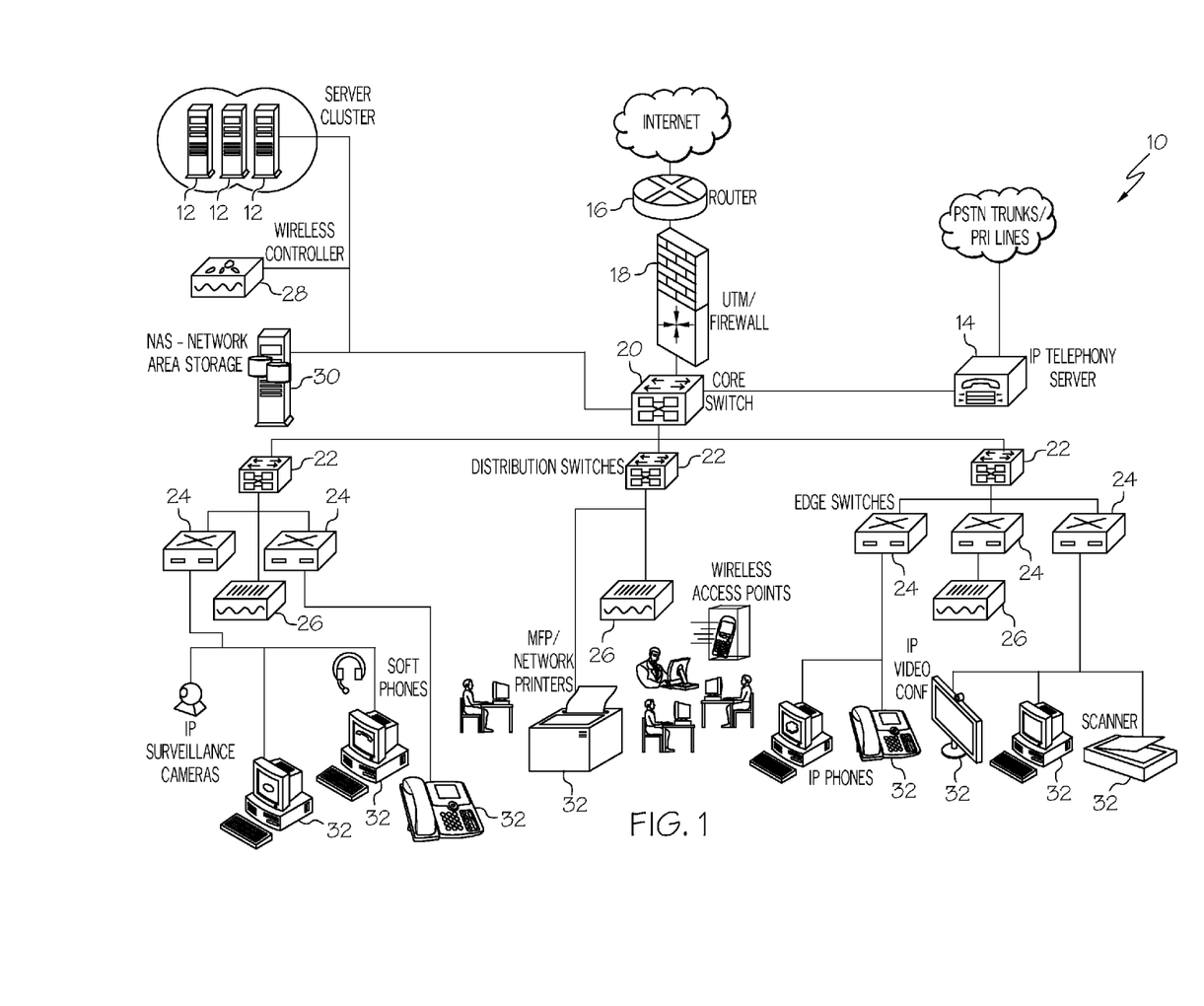
FIG. 1 illustrates an example network that includes a plurality of network interfaces.

Referring now to FIG. 1, an example network 10 that includes a plurality of network interfaces is shown. The network 10 includes a number of servers 12 and 14, a router 16, a firewall 18, a core switch 20, distribution switches 22, edge switches 24, wireless access points 26, a wireless controller 28, and a network area storage device 30. Each of these may be monitored for QoS. Also, each of the devices 12-30 may include a plurality of network interfaces that each supports a plurality of traffic classes. Each of the switches 20, 22, 24, for example, may support a plurality of ports, and each of those ports may be considered a "network interface" in some embodiments. The network also includes a plurality of computing devices 32 connected to the edge switches 24 and wireless access points 26. These computing devices 32 may include desktop computers, printers, video conferencing hardware, etc. In some embodiments, some or all of these devices are also be monitored for QoS purposes. Of course, it is understood that the network 10 shown in FIG. 1 is only a non-limiting example, and that other networks, including ones that are more complex, could be monitored.

Figure 2:
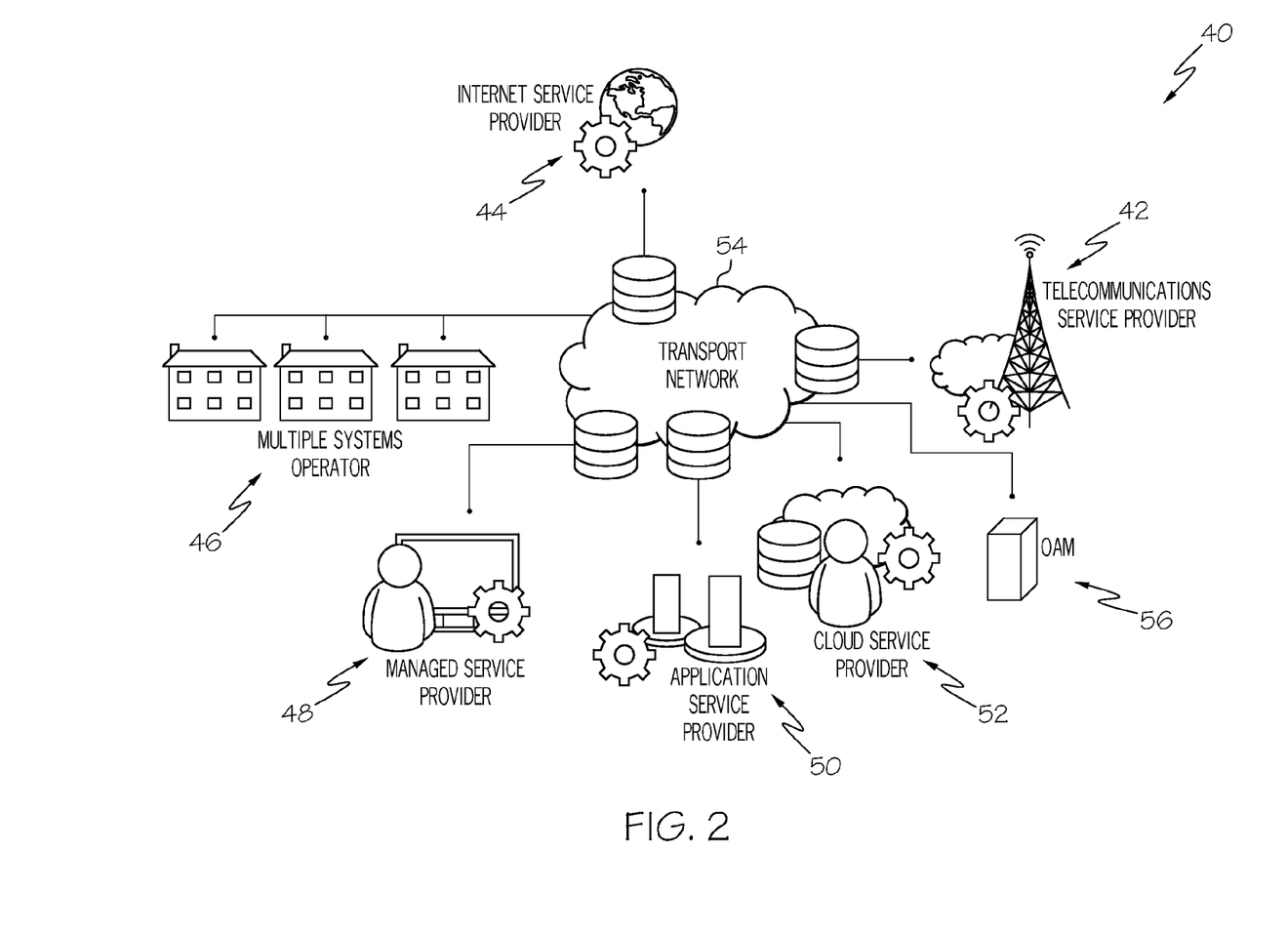
FIG. 2 illustrates components of an example Communications Service Provider (CSP) network that includes a plurality of network interfaces.

FIG. 2 illustrates components of an example Communications Service Provider (CSP) network 40 that includes a plurality of network interfaces. The CSP network 40 includes a number of different components, including a telecommunications service provider component 42, an Internet Service Provider (ISP) component 44, a multiple systems operator component 46, a managed service provider component 48, an application service provider component 50, and a cloud service provider component 52. Each of the components 42-52 is connected through one or more transport networks 54.

The telecommunications service provider component 42 may include one or more wireless communication networks configured according to one or more established wireless communication standards. This could include Third Generation Partnership Project (3GPP) standards, such as Global System for Mobile Communications (GSM), Wideband Code Division Multiple Access (W-CDMA), Long Term Evolution (LTE), etc., for example. The Internet service provider component 44 may provide Internet access to residential and/or commercial entities either in conjunction with, or separate from the multiple systems operator component 46 (which provides television services). The managed service provider component 48, application service provider component 50, and cloud service provider component 52 may provide various services such as data backup, database hosting, application hosting, email hosting, videoconferencing, etc.

Each of the components 42-52 includes a plurality of network interfaces which are part of a plurality of computing devices (e.g., wireless base stations, routers, switches, and other network hardware). For a CSP network such as the CSP network 40, the number of network interfaces that are available for QoS monitoring can grow to be quite large, and can correspondingly yield many thousands (or even millions) of KPIs being returned for a given periodic QoS polling cycle.

An Operation, Administration, and Management (OAM) server 56, which is also connected to the transport network 54, is configured to determine which network interfaces and/or which traffic classes should be excluded from QoS polling. The same or another OAM server is used to perform QoS polling for one or more of the components 42-52. Thus, although a single OAM server 54 is shown, it is understood that there could be a plurality of OAM servers in the CSP network 40. In some examples, various components 42-52 may have their own dedicated OAM server (e.g., an OAM server dedicated only to the telecommunications service provider component 42).

Figure 3:
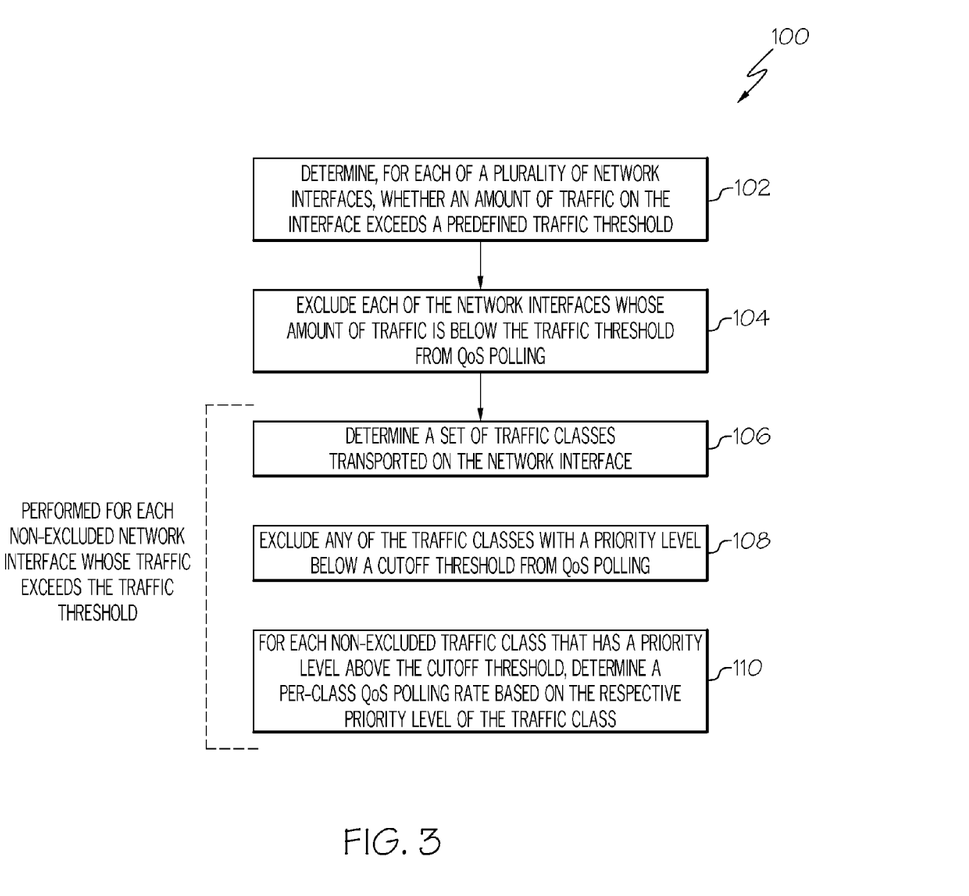
FIG. 3 illustrates an example computer-implemented method for selectively excluding network interfaces and/or traffic classes from Quality of Service (QoS) polling.

With this in mind, FIG. 3 illustrates an example computer-implemented method 100 for selectively excluding network interfaces and/or traffic classes from QoS polling. For each of a plurality of network interfaces, a determination is made of whether an amount of traffic on the network interface exceeds a predefined traffic threshold (block 102). Each of the network interfaces whose amount of traffic is below the traffic threshold is excluded from QoS polling (block 104). For each of the non-excluded network interfaces whose traffic exceeds the traffic threshold, the following is performed:

determining a set of traffic classes transported on the network interface (block 106);

excluding any of the traffic classes with a priority level below a cutoff threshold from QoS polling (block 108); and     for each non-excluded traffic class that has a priority level above the cutoff threshold, determining a per-class QoS polling rate based on the respective priority level of the traffic class (block 110).

Subsequently, QoS polling can be performed for each non-excluded traffic class of a given network interface according to the respective determined per-class polling rate for the non-excluded traffic class. This QoS polling may be performed such that the given network interface is polled at different QoS polling rates for different ones of its non-excluded traffic classes. In some embodiments, the same computing device (e.g., OAM server 56) performs the method 100 and also performs the QoS polling. In other embodiments, a first computing device (a "monitoring server") may perform the method 100, and one or more different second computing devices ("pollers") perform the QoS polling using the determined per-class QoS polling rates, based on the determined exclusions. If the computing device that performs the method 100 is not the same computing device that performs QoS polling, then the determined network interface and/or traffic class exclusions could be provided to the poller in the form of one or more exclusionary lists, for example.

The plurality of network interfaces could include network interfaces from a plurality of computing devices in a network (e.g., a plurality of the devices listed in FIG. 1 and/or devices from a plurality of the various components 42-52 shown in FIG. 2). By using the method 100, different network interfaces can be polled at different rates (e.g., due to different determined per-class polling rates and/or to different thresholds being used for different interfaces).

An example of the method 100 will now be discussed in connection with the QoS polling rates of table 60 of FIG. 4 and the network interfaces A, B, C, and D of table 70 of FIG. 5. For this discussion, assume that the "plurality of network interfaces" includes interfaces A, B, C, and D of table 70. A determination is made of whether an amount of traffic on each network interface exceeds a predefined traffic threshold (block 102). This determination may be made according to an observation period (e.g., basing the analysis of block 102 on a defined period of time during which traffic is carried on the interface). Assuming the traffic threshold is 10 megabits per second (Mbps), this would cause interface A, which has a throughput of 1 Mbps, to be excluded (block 104). A determination would then be made of a set of traffic classes transported on each of the non-excluded network interfaces (i.e., interfaces, B, C, and D) (block 106). In one or more embodiments, determining the set of traffic classes transported on a given network interface is based on a determination of what applications transmit traffic on the given interface within the observation period. This may include performance of Network Based Application Recognition (NBAR), for example.

Figure 4:
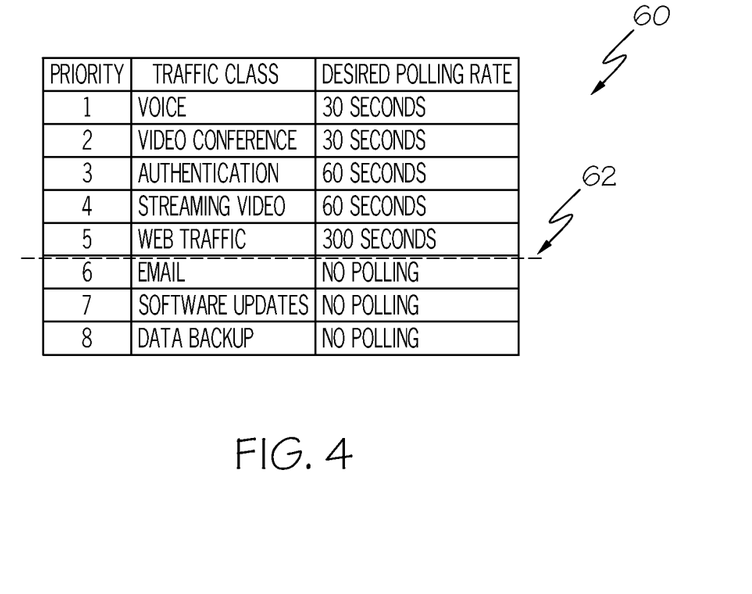
FIG. 4 illustrates a plurality of example polling rates.
Figure 5:
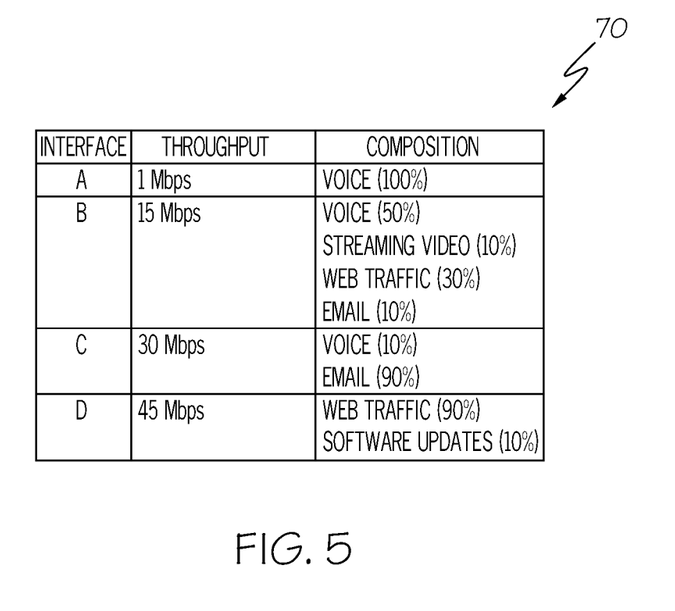
FIG. 5 illustrates an example of traffic classes carried on a set of network interfaces.

In the example of FIGS. 4-5 the determined types of traffic classes include the following:

interface B: {voice, streaming video, web traffic, email}
interface C: {voice, email}
interface D: {web traffic, software updates}.

Because interface A is excluded from QoS monitoring, analysis of which traffic classes are transmitted on interface A can be omitted. Thus, even though voice is transmitted on interface A and voice is the highest priority traffic class in the table 60 of FIG. 4, because only a small amount of overall traffic is transmitted on interface A (i.e., an amount below the traffic threshold), the voice traffic on interface A can be omitted from QoS polling.

Any traffic below a cutoff threshold 62 is excluded from QoS polling (block 108). Thus, for interfaces B and C the email traffic would be excluded from QoS polling. For interface D, the software updates would be excluded from QoS polling.

The non-excluded traffic classes would then include the following:

interface B {voice, streaming video, web traffic}
interface C {voice}
interface D {web traffic}.

Then, for each non-excluded traffic class on each non-excluded interface that has a priority level above the cutoff threshold 62, a per-class QoS polling rate is determined based on the respective priority level of the traffic class (block 110). The respective priority levels indicate a level of importance of a given traffic class. Voice, for example, is more important than email traffic from a QoS standpoint, because a greater amount of latency can be accommodated for email traffic (e.g., a user may find it acceptable to receive an email after 3-5 seconds, while a similar delay in a voice call would likely be unacceptable). According to the tables 60, 70, the following per-class polling rates would be determined:

interface B {voice once every 30 seconds, streaming video once every 60 seconds, web traffic once every 300 seconds}
interface C {voice: once every 30 seconds}
interface D {web traffic: once every 300 seconds}.

As shown in the table 60 of FIG. 4, decreasing priority levels have decreasing polling rates, such that interface B would be polled at different QoS polling rates for each of its voice, streaming video, and web traffic. Such an intelligent QoS monitoring approach can help to focus QoS resources on the most important network interfaces, and the most important types of traffic carried on those network interfaces.

In some examples, one or more of the traffic classes below the cutoff threshold 62 are considered "class-default" traffic. So-called "class-default" traffic is by definition "best effort" traffic, and often encompasses up to 20% of the traffic on a typical network. Nevertheless, it may be of little value for an administrator to monitor. Excluding such traffic from QoS monitoring via the cutoff threshold 62 can yield significant resource usage reductions.

In some embodiments, a given traffic class which has a priority level above the cutoff threshold 62 may nevertheless be excluded from QoS polling if an amount of traffic of that traffic class on the given network interface is less than a predefined percentage of overall traffic on the given network interface. For example, assume that the predefined percentage is 15%. On interface C, the traffic class email is excluded from QoS monitoring, which only leaves voice traffic. However, voice traffic only accounts for 10% of the traffic on interface C, which is below the percentage of 15%. Therefore, this voice traffic may also be excluded from QoS monitoring (meaning the entire interface C is effectively excluded). This may be useful in excluding QoS data in instances where the data of interest (e.g., voice data on interface C) is not of a meaningful sampling size. Of course, 15% is only an example, and it is understood that other percentages could be used. Also, different percentages could be used for different network interfaces.

In one or more embodiments, the predefined percentage varies based upon the throughput of the given interface. For example, a lower percentage may be used for interfaces with a higher throughput. For example, for interface C 15% of the overall throughput is 4.5 Mbps. Using the example from above, any individual class that has less than 4.5 Mbps throughput on interface C would be excluded from QoS monitoring. Notably though, 15% of traffic on interface B is 2.25 Mbps. So, for interface B the percentage used may be 30% (as 30% of 15 Mbps is 4.5 Mbps). Accordingly, a higher percentage could be used for interfaces with lower throughputs to achieve a relatively similar sampling size, and the predefined percentage could be selected to establish a minimum amount of throughput for a given traffic class that is considered to be meaningful.

Of course, although the table 60 of FIG. 4 has been discussed in connection with the method 100, it is understood that these are only example values, and that other values could be used. It is further understood that different traffic thresholds, different cutoff thresholds, or both, could be used for different ones of the plurality of network interfaces. For example, certain types of traffic may be of the utmost importance for certain network interfaces, while being of relatively low (or no) importance on other network interfaces. To accommodate these differing priorities, different thresholds could be used. In one example, this takes the form of a different table (e.g., the table 60 of FIG. 4) for different ones of the network interfaces.

In the table 60 of FIG. 4, a polling rate of "no polling" indicates that corresponding traffic classes (e.g., email, software updates, and data backup) are to be excluded from QoS polling entirely. As discussed above, network interfaces that carry traffic that having a non-zero polling rate (e.g., voice traffic, video conference traffic, etc.) may nevertheless still be excluded if a percentage of traffic having a non-zero polling rate on the interface is less than a predefined percentage of overall traffic on the network interface.

Some networks include hierarchical QoS policies, such that a given traffic class is a parent traffic class that has a nested sub-hierarchy of child traffic classes. In such embodiments, exclusion of the parent traffic class from QoS polling could correspondingly result in exclusion of any child traffic classes that are beneath it on the hierarchy from QoS polling. In the same or another embodiment, a hierarchical QoS policy includes a given traffic class in a parent QoS policy and also in one or more child QoS policies of that parent. In such embodiments, exclusion of the given traffic class in the parent QoS policy from QoS polling could result in exclusion of the same traffic class in each child QoS policy of that parent from QoS polling.

Figure 6:
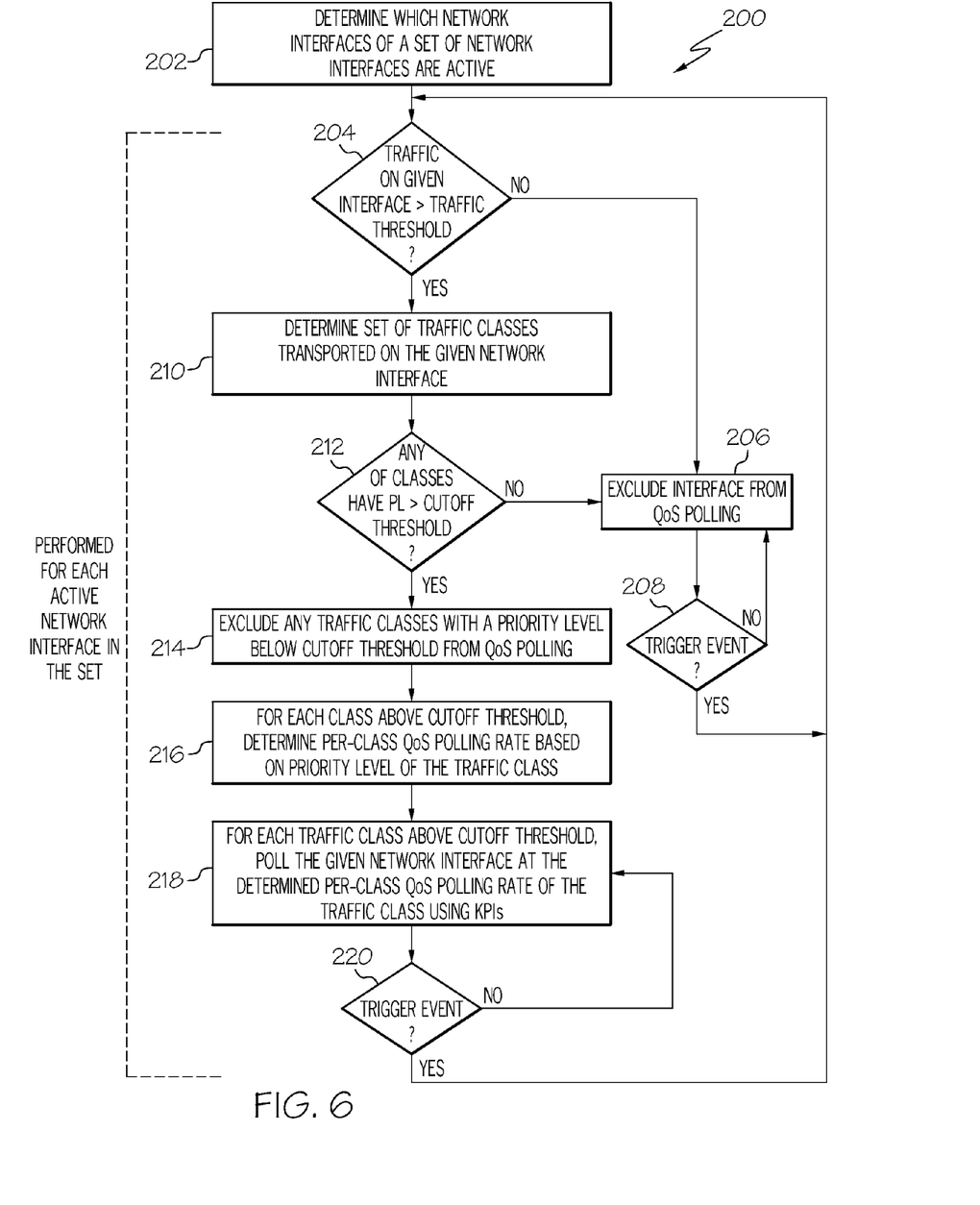
FIG. 6 illustrates an example implementation of the method of FIG. 3.

Referring now to FIG. 6, an example implementation of the method 100 is shown as flowchart 200. A determination is made of which network interfaces of a set of network interfaces are active (i.e., support an amount of traffic that exceeds a predefined traffic threshold) (block 202). For each "active" network interface in the set, blocks 204-220 are conditionally performed. A given one of the network interfaces will be discussed in connection with blocks 204-220. If an amount of traffic on the given network interface is less the predefined traffic threshold (a "NO" to block 204), then that network interface is excluded from QoS polling (block 206), and remains excluded until the occurrence of a trigger event (a "YES" to block 208).

A trigger event could include a predefined time period elapsing (e.g., on the order of thirty minutes or an hour), such that the plurality of network interfaces in the set are re-analyzed according to the method 100 periodically in a QoS rediscovery process. As another example, the trigger event could include a received indication that a given type of traffic is now being carried on a given network interface. Such a trigger event notification could be received as a Simple Network Management Protocol (SNMP) trap, for example.

Use of SNMP traps can remove the need to perform costly QoS rediscoveries in which given interfaces are directly queried to determine if they have changed (e.g., to ask if new traffic is being carried, to ask if an amount of supported traffic has changed, etc.). To avoid this, the computing devices that provides a given network interface (e.g., a router) can be configured to provide an SNMP trap to a monitoring server upon the occurrence of a trigger event. While it may still be desirable to perform additional QoS discovery with some regularity, use of SNMP traps can be used to lessen the frequency of such QoS discovery processes, and consequently use less computing resources and less network bandwidth. The use of SNMP traps effectively places the burden on the device being monitored to notify a monitoring server as to when it should be monitored, instead of relying on the server to ask the computing device if something has changed.

Referring again to FIG. 6, if the amount of traffic on the given network interface is greater than the traffic threshold (a "YES" to block 204), a determination is made of a set of traffic classes being transported on the given network interface (block 210). If none of the traffic classes have a priority level above the cutoff threshold (a "NO" to block 212), then the interface is excluded from QoS polling (block 206). Otherwise, if any of the traffic classes do have a priority level above the cutoff threshold (a "YES" to block 212), then any traffic classes on the interface with a priority level below the cutoff threshold are excluded from QoS polling (block 214) without excluding the entire interface.

For each traffic class above the cutoff threshold, a per-class QoS polling rate is determined based on a priority level of the traffic class (block 216), and the given network interface is polled at the determined QoS polling rate of the traffic class using one or more KPIs (block 218). If no trigger event occurs (a "NO" to block 220), then the QoS polling at the determined per-class polling rates continues. Otherwise, if a trigger event does occur (a "YES" to block 220), then the set of network interfaces are re-analyzed. As discussed above, in some embodiments a separate computing device may perform the QoS polling (see block 218) than performs the determination of what network interfaces and/or traffic classes are to be excluded from QoS polling.

The QoS polling of block 218 is performed using Key Performance Indicators (KPIs). Some example KPIs could include a quantity of dropped packets, a probability that an incoming packet will be dropped, a quantity of delayed packets, etc. The same KPI may be analyzed separately for each of the plurality of traffic classes of a given network interface. Also, different KPIs may be used for different traffic classes and/or for different "actions" of a QoS policy. For example, if a QoS policy has a "policing action" in which a maximum transmission rate is enforced, the following KPIs may be used: conformed packets (or bytes), exceeded packets (or bytes), and violated packets (or bytes). As another example, if a QoS policy has a "shaping action" in which bursty traffic output is smoothed to exhibit a more consistent transmission rate, the following KPIs may be used: delayed packets (or bytes), dropped packets (or bytes), and current queue size. As yet another example, if a QoS policy has a "queuing action" in which packets are queued, the following KPIs may be used: current queue depth, maximum queue depth, and queue discard packets (or bytes).

Also, as discussed above in connection with FIG. 6, a trigger event may be used as a basis for ceasing to exclude a network interface (see block 208) and/or ceasing to exclude a traffic class of a non-excluded interface (see block 220). Thus, in one or more embodiments, a trigger event notification is received from a given excluded network interface (a "YES" to block 208), and based on that trigger event notification the computer implementing the method 100 ceases to exclude the given network interface from QoS polling if, after the trigger event, an amount of traffic on the given network interface exceeds the predefined traffic threshold (a "YES" to block 204), and one or more traffic classes transported on the given network interface have a priority level above the cutoff threshold (a "YES" to block 212).

Also, as discussed above in connection with FIG. 5, in some embodiments, for a given non-excluded network interface whose traffic exceeds the traffic threshold (e.g., interface C of FIG. 5), a given traffic class that has a priority level above the cutoff threshold is nevertheless excluded from QoS polling if an amount of traffic of that traffic class on the given network interface is less than a predefined percentage of overall traffic on the given network interface (e.g., the voice traffic on interface C being only 10% of the relevant traffic, which is less than the example percentage of 15% discussed above).

In such embodiments, such excluded traffic classes may nevertheless be included in QoS polling at a later time. In one example, a trigger event notification for the given excluded traffic class is received, and based on the trigger event notification, the computer implementing method 100 ceases to exclude the given traffic class from QoS polling if, after the trigger event, an amount of traffic of that traffic class on the given network interface is greater than the predefined percentage of overall traffic on the given network interface. Also, in some embodiments different percentages could be used for different network interfaces.

Network Based Application Recognition (NBAR) may be performed in connection with determining the amount of traffic on a given network interface (blocks 102 and 202) and/or in connection with determining the traffic classes transported on a given network interface (blocks 106 and 210). NBAR determines the traffic of a particular application type based on what port numbers are used, and also analyzes how much traffic is carried on network interfaces. NBAR typically analyzes a number of things, including the following:

quantity of incoming packets;
quantity of outgoing packets;
quantity of incoming bytes;
quantity of outgoing bytes;
incoming bitrate;
outgoing bitrate; and
ports used by a network interface.

Some or all of this information may be obtained by reading Management Information Base (MIB) information received through NBAR to determine the amount of traffic transported on a given network interface. Determination of what traffic classes are transported on a given network interface using NBAR may rely on the port numbers used by such traffic.

Figure 7:
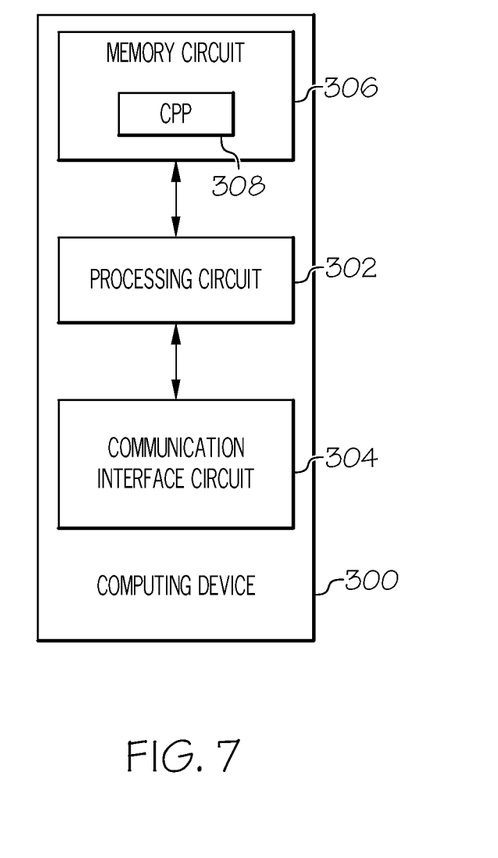
FIG. 7 illustrates an example computing device operative to selectively exclude network interfaces and/or traffic classes from QoS polling.

FIG. 7 illustrates an example computing device 300 operative to selectively exclude network interfaces and/or traffic classes from QoS polling. The computing device 300 includes a processing circuit 302 and a communication interface circuit 304. The communication interface circuit 304 is configured to communicate data with a plurality of computing devices that support a plurality of network interfaces in a network (e.g., a plurality of routers, switches, etc. in the network of FIG. 1). The processing circuit 302 is configured to determine, for each of the plurality of network interfaces, whether an amount of traffic on the network interface exceeds a predefined traffic threshold; and to exclude each of the network interfaces whose amount of traffic is below the traffic threshold from QoS polling. For each of the non-excluded network interfaces whose traffic exceeds the traffic threshold, the processing circuit 302 is configured to:

determine a set of traffic classes transported on the network interface;

exclude any of the traffic classes with a priority level below a cutoff threshold from QoS polling; and for each non-excluded traffic class that has a priority level above the cutoff threshold, determine a per-class QoS polling rate based on the respective priority level of the traffic class.

The processing circuit 302 may be configured to implement any of the embodiments of the method 100 discussed above. The computing device 300 may comprise an OAM server 56 in some embodiments.

The computing device 300 also includes a memory circuit 306 that may be configured to store the traffic threshold, the cutoff threshold, and priority level information for the traffic classes supported by the computing device 300. In one embodiment, the memory circuit 306 includes a computer program product 308 that comprises computer readable program code that configures the computing device 300 to implement the method 100. Thus, the computer readable program code configures the computing device 300 to determine, for each of a plurality of network interfaces, whether an amount of traffic on the network interface exceeds a predefined traffic threshold; and exclude each of the network interfaces whose amount of traffic is below the traffic threshold from QoS polling. The computer readable program code further configures the computing device 300 to, for each of the non-excluded network interfaces whose traffic exceeds the traffic threshold:

determine a set of traffic classes transported on the network interface;

exclude any of the traffic classes with a priority level below a cutoff threshold from QoS polling; and for each non-excluded traffic class that has a priority level above the cutoff threshold, determine a per-class QoS polling rate based on the respective priority level of the traffic class.

In the prior art, the prevailing philosophy for performing QoS has been a "more is better" approach that polled every interface at the same polling rate no matter how much traffic was supported on the interface, and no matter what traffic classes were supported on the interface. However, the growing amount of QoS data that is received in a given polling cycle can be overwhelming, and can make it very difficult to make meaningful inferences and decisions, especially when such a high volume of QoS data is continually received with each QoS polling period. The techniques discussed herein alleviate these challenges by reducing the amount of QoS data obtained to a more manageable level. By excluding interfaces and/or traffic classes that are of less importance, greater attention can be dedicated to the most important interfaces and the most important traffic classes. The techniques discussed herein facilitate an intelligent determination of where to focus management and monitoring resources, even as the demands of big data applications grow.

Moreover, the techniques discussed herein provide a highly adaptable framework that can be readily customized based on the given interests of an organization. For example, the traffic threshold, cutoff threshold, and traffic class priority levels can be adjusted as desired so that the interfaces and/or traffic classes that are of the highest importance to a given organization are monitored more than the interfaces and/or traffic classes that are of the least importance.

This highly adaptable approach is useful considering that many networks use multiple types of technology, and use equipment from multiple vendors. In some examples, Ethernet (IEEE 802.1) uses eight different traffic classes, IPv4/v6 uses sixty four traffic classes, Wireless LAN (IEEE 802.11e) uses eight traffic classes, etc. The techniques discussed herein can accommodate these varying quantities of traffic classes based on user settings (e.g., the table 60 of FIG. 4) that indicate what traffic classes are of particular interest (i.e., are above the cutoff threshold 62), and indicating what per-class polling rates should be used for such classes.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   determining, for each of a plurality of network interfaces, whether an amount of traffic on the network interface exceeds a predefined traffic threshold;
   excluding each of the network interfaces whose amount of traffic is below the traffic threshold from Quality of Service (QoS) polling; and
   for each of the non-excluded network interfaces whose traffic exceeds the traffic threshold:
      determining a set of traffic classes transported on the network interface;
      excluding any of the traffic classes with a priority level below a cutoff threshold from QoS polling; and
      for each non-excluded traffic class that has a priority level above the cutoff threshold, determining a per-class QoS polling rate based on the respective priority level of the traffic class.

2. The computer-implemented method of claim 1, further comprising:
   receiving a trigger event notification for a given excluded network interface; and
   based on the trigger event notification, ceasing to exclude the given network interface from QoS polling if, after the trigger event, an amount of traffic on the given network interface exceeds the predefined traffic threshold, and one or more traffic classes transported on the given network interface have a priority level above the cutoff threshold.

3. The computer-implemented method of claim 1, further comprising, for a given non-excluded network interface whose traffic exceeds the traffic threshold:
   excluding a given traffic class that has a priority level above the cutoff threshold from QoS polling if an amount of traffic of that traffic class on the given network interface is less than a predefined percentage of overall traffic on the given network interface.

4. The computer-implemented method of claim 3, further comprising:
   receiving a trigger event notification for the given excluded traffic class; and
   based on the trigger event notification, ceasing to exclude the given traffic class from QoS polling if, after the trigger event, an amount of traffic of that traffic class on the given network interface is greater than the predefined percentage of overall traffic on the given network interface.

5. The computer-implemented method of claim 1, further comprising, for each non-excluded network interface:
   performing QoS polling for each non-excluded traffic class of the network interface according to the respective determined per-class polling rate for the non-excluded traffic class;
   wherein the QoS polling is performed such that the network interface is polled at different QoS polling rates for different ones of its non-excluded traffic classes.

6. The computer-implemented method of claim 1, wherein different traffic thresholds, different cutoff thresholds, or both, are used for different ones of the network interfaces.

7. The computer-implemented method of claim 1, wherein the plurality of network interfaces comprises network interfaces from a plurality of computing devices in a network.

8. The computer-implemented method of claim 1, wherein determining the set of traffic classes transported on a given network interface is based on a determination of what applications transmit traffic on the given interface.

9. A computing device comprising:
   a communications interface circuit configured to communicate data with a plurality of computing devices that support a plurality of network interfaces in a network; and
   a processing circuit configured to:
      determine, for each of the plurality of network interfaces, whether an amount of traffic on the network interface exceeds a predefined traffic threshold;
      exclude each of the network interfaces whose amount of traffic is below the traffic threshold from Quality of Service (QoS) polling; and
      for each of the non-excluded network interfaces whose traffic exceeds the traffic threshold:
         determine a set of traffic classes transported on the network interface;
         exclude any of the traffic classes with a priority level below a cutoff threshold from QoS polling; and
         for each non-excluded traffic class that has a priority level above the cutoff threshold, determine a per-class QoS polling rate based on the respective priority level of the traffic class.

10. The computing device of claim 9, wherein the processing circuit is further configured to:
    receive a trigger event notification for a given excluded network interface from the communications interface circuit; and
    based on the trigger event notification, cease to exclude the given network interface from QoS polling if, after the trigger event, an amount of traffic on the given network interface exceeds the predefined traffic threshold, and one or more traffic classes transported on the given network interface have a priority level above the cutoff threshold.

11. The computing device of claim 9, wherein the processing circuit is further configured to, for a given non-excluded network interface whose traffic exceeds the traffic threshold:
    exclude a given traffic class that has a priority level above the cutoff threshold from QoS polling if an amount of traffic of that traffic class on the given network interface is less than a predefined percentage of overall traffic on the given network interface.

12. The computing device of claim 11, wherein the processing circuit is further configured to:
    receive a trigger event notification for the given excluded traffic class; and
    based on the trigger event notification, cease to exclude the given traffic class from QoS polling if, after the trigger event, an amount of traffic of that traffic class on the given network interface is greater than the predefined percentage of overall traffic on the given network interface.

13. The computing device of claim 9, wherein the processing circuit is further configured to, for each non-excluded network interface:
  perform QoS polling for each non-excluded traffic class of the network interface according to the respective determined per-class polling rate for the non-excluded traffic class;
  wherein the QoS polling is performed such that the network interface is polled at different QoS polling rates for different ones of its non-excluded traffic classes.

14. The computing device of claim 9, wherein different traffic thresholds, different cutoff thresholds, or both, are used for different ones of the network interfaces.

15. The computing device of claim 9, wherein the plurality of network interfaces comprises network interfaces from a plurality of computing devices in the network.

16. The computing device of claim 9, wherein the determination of the set of traffic classes transported on a given network interface is based on a determination of what applications transmit traffic on the given interface.

17. A computer program product comprising:
  a computer readable storage medium having computer readable program code embodied therewith, the computer readable program code comprising:
    computer readable program code configured to determine, for each of a plurality of network interfaces, whether an amount of traffic on the network interface exceeds a predefined traffic threshold;
    computer readable program code configured to exclude each of the network interfaces whose amount of traffic is below the traffic threshold from Quality of Service (QoS) polling; and
    computer readable program code configured to, for each of the non-excluded network interfaces whose traffic exceeds the traffic threshold:
      determine a set of traffic classes transported on the network interface;
      exclude any of the traffic classes with a priority level below a cutoff threshold from QoS polling; and
      for each non-excluded traffic class that has a priority level above the cutoff threshold, determine a per-class QoS polling rate based on the respective priority level of the traffic class.

18. The computer program product of claim 17, wherein the computer readable program code further comprises:
  computer readable program code configured to receive a trigger event notification for a given excluded network interface; and
  computer readable program code configured to, based on the trigger event notification, cease to exclude the given network interface from QoS polling if, after the trigger event, an amount of traffic on the given network interface exceeds the predefined traffic threshold, and one or more traffic classes transported on the given network interface have a priority level above the cutoff threshold.

19. The computer program product of claim 17, wherein the computer readable program code further comprises computer readable program code configured to, for a given non-excluded network interface whose traffic exceeds the traffic threshold:
  exclude a given traffic class that has a priority level above the cutoff threshold from QoS polling if an amount of traffic of that traffic class on the given network interface is less than a predefined percentage of overall traffic on the given network interface.

20. The computer program product of claim 19, wherein the computer readable program code further comprises:
  computer readable program code configured to receive a trigger event notification for the given excluded traffic class; and
  computer readable program code configured to, based on the trigger event notification, cease to exclude the given traffic class from QoS polling if, after the trigger event, an amount of traffic of that traffic class on the given network interface is greater than the predefined percentage of overall traffic on the given network interface.

21. The computer program product of claim 17, wherein the computer readable program code further comprises computer readable program code configured to, for each non-excluded network interface:
  perform QoS polling for each non-excluded traffic class of the network interface according to the respective determined per-class polling rate for the non-excluded traffic class;
  wherein the QoS polling is performed such that the network interface is polled at different QoS polling rates for different ones of its non-excluded traffic classes.

22. The computer program product of claim 17, wherein different traffic thresholds, different cutoff thresholds, or both, are used for different ones of the network interfaces.

23. The computer program product of claim 17, wherein the plurality of network interfaces comprises network interfaces from a plurality of computing devices in a network.

24. The computer program product of claim 17, wherein the determination of the set of traffic classes transported on a given network interface is based on a determination of what applications transmit traffic on the given interface.

* * * * *